Oct. 4, 1932.   C. C. FARMER   1,880,958
SAFETY CAR CONTROL DEVICE
Filed Aug. 7, 1929
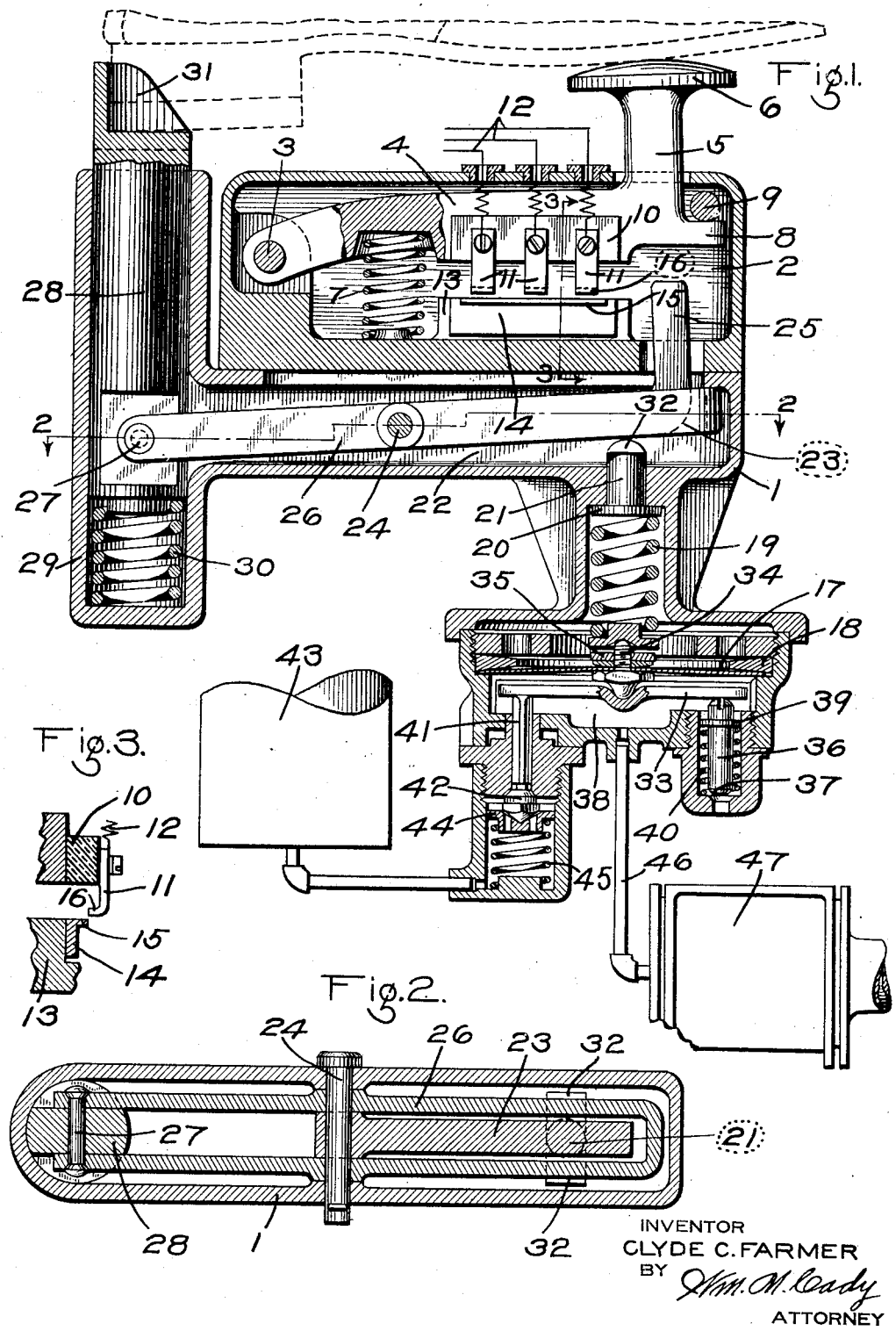
INVENTOR
CLYDE C. FARMER
BY *Wm. M. Cady*
ATTORNEY Patented Oct. 4, 1932

1,880,958

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR CONTROL DEVICE

Application filed August 7, 1929. Serial No. 384,115.

This invention relates to safety brake devices, and more particularly to a safety brake device adapted to be controlled by the foot of the operator.

One object of my invention is to provide a brake controlling device in which manual movement of a member controls both a dynamic or regenerative brake and a fluid pressure brake.

Another object of my invention is to provide a foot controlled safety brake, which is adapted to control both a dynamic brake and a fluid pressure brake and is also adapted to apply the brakes when the operator becomes incapacitated.

Another object of my invention is to provide a safety brake equipment in which the movement of the foot controls the application and release of the brakes and the removal of the foot causes an application of the brakes.

Other objects and advantages will appear in the following more detailed description of the invention.

In the accompanying drawing: Figure 1 is a diagrammatic view, mainly in section of a safety brake apparatus embodying my invention; Fig. 2 a section on the line 2—2 of Fig. 1; and Fig. 3 a section on the line 3—3 of Fig. 1.

A device embodying my invention is shown in the drawing, which comprises a suitable casing 1 having a chamber 2 in which is pivotally mounted on a pin 3 a foot operable lever 4. Said lever has a stem 5 which extends upwardly through an opening in the casing and is provided at its outer end with a foot engageable button 6.

A coil spring 7, mounted in chamber 2 engages the under face of lever 4 and urges said lever upwardly, the upward movement, however, being limited by the engagement of a lug 8, carried by said lever, with a pin 9, secured in the casing.

The lever 4 carries a block 10 of insulating material and secured to said block are a plurality of contact fingers 11, connected to wires 12. The wires 12 lead to electric propelling power system of the vehicle and are so connected that when the contact fingers are bridged, circuits will be established by which a dynamic or regenerative braking action is effected, by causing the vehicle motors to act as generators in the well known manner. As systems of this character are well known in the art, it is not deemed necessary to show the wiring circuits by which this action is secured.

Secured to an upwardly extending portion 13 of the casing is a contact member 14 having a laterally extending portion 15 adapted to be engaged by turned in ends 16 carried by the contact fingers 11.

Associated in the casing 1 is a fluid pressure brake valve device comprising a flexible diaphragm 17 clamped in place by a follower plate 18 and subject on one side to the pressure of a coil spring 19. Said spring engages a head 20 carried by a movable stem 21 which extends through an opening in the casing wall, into a chamber 22.

In chamber 22 a lever 23 is pivotally mounted on a pin 24 and said lever adjacent to one end, is adapted to engage the stem 21. The lever 23 is provided with an upturned end portion 25 which extends through an opening in the casing 1 into chamber 2, in position to be engaged by lever 4, when said lever is depressed.

Also pivotally mounted on the pin 24 is a yoke lever 26 which encloses the lever 23. Upward movement of the yoke lever 26 is limited by the engagement of the end of the lever with an inwardly extending portion of the casing 1. At the opposite end, the yoke lever 26 is pivotally connected by a pin 27 to a plunger 28 which plunger is guided for vertical movement in a cylindrical portion 29 of the casing 1.

Interposed between the lower end of the plunger 28 and the lower end wall of the cylindrical portion 29 is a coil spring 30 and the upper end of the plunger is provided with a cavity 31 shaped to receive the heel of the operator's foot. The upper end of the stem 21 is provided with laterally extending lugs 32 adapted to be engaged by the yoke lever 26 when said lever is depressed.

Disposed below the diaphragm 17 of the brake valve device is a bar 33 having a rounded cavity intermediate its ends, in which the rounded end of a screw 34 engages, said screw having threaded engagement in a block 35, carried by the diaphragm 17.

Engaging one end of the bar 33 is the stem 36 of a release valve 37, said valve controlling the release of fluid from chamber 38, below diaphragm 17, to the atmosphere.

The stem 36 carries a collar 39, which is acted upon by a coil spring 40, surrounding the stem and tends to urge the valve 38 away from its seat. The opposite end of the bar 33 is engaged by the stem 41 of a fluid pressure supply valve 42, said valve controlling communication from a source of fluid under pressure, such as the storage reservoir 43, to chamber 38. The valve 42 is engaged at its lower end by a follower member 44 which is acted upon by a coil spring 45.

Connected to chamber 38 by a pipe 46 is a brake cylinder 47, so that when fluid under pressure is supplied to chamber 38, it flows to the brake cylinder and when fluid is released from said chamber, fluid is also released from the brake cylinder.

The spring 30 is of greater resistance than the spring 19, so that if the spring 30 is allowed to act through the yoke lever 26, the stem 21 will be depressed against the resistance of spring 19.

In operation, the operator normally holds his foot on the device, so that the heel of the foot engages in the cavity 31 and with his heel he maintains the plunger depressed, as shown in the drawing. With the plunger 28 held depressed, the yoke lever 26 slightly clears the lugs 32 of the stem 21, so that the spring 19 of the brake valve device is not compressed.

The operator does not normally exert the pressure of his foot on the button 6, so that the lever 4 is held in the position shown in the drawing, by spring 7. Power may now be applied to the vehicle motors, so as to run the vehicle along the road.

If the operator wishes to apply the dynamic brake, he depresses the button 6 by the toe of the foot, while still maintaining the plunger 28 depressed by the heel. When lever 4 is moved downwardly by depressing the button 6, the contact fingers 11 are caused to engage the bridging contact 15 and thereby the required circuits are set up, so that the vehicle motors act as generators to cause the well known dynamic braking effect.

If the dynamic brake should fail for any reason, or if the speed of the vehicle is so low, that the dynamic braking effect is slight, or if for any reason it is desired to apply the fluid pressure brakes, the button 6 is further depressed, so that the contact fingers 11 move past and out of engagement with the contact member 15, thereby cutting out the dynamic brake, and then the movement of the lever 4 causes said lever to engage the member 25 of lever 23. The lever 23 is then depressed and thereby the stem 21 is operated to compress the spring 19.

The pressure of spring 19 then acts to depress the diaphragm 17 and thereby the bar 33 is moved to depress the stem 36 of the release valve, with the stem 41 acting as a fulcrum. When the release valve 37 has been thus brought to its seat, cutting off communication from chamber 38 to the atmosphere, further depression of the diaphragm 17 causes movement of the bar 33, with the stem 36 acting as a fulcrum so that the stem 41 is actuated to unseat the valve 42. Fluid under pressure is then supplied from reservoir 43 to chamber 38 and thence to the brake cylinder 47.

When the pressure in chamber 38 has been increased to a degree slightly exceeding the pressure of spring 19, the diaphragm will be deflected upwardly, so as to permit the valve 42 to seat and cut off the further flow of fluid to the brake cylinder, but without permitting the release valve 37 to unseat.

The more the spring 19 is compressed by the movement of the lever 23, the greater the pressure of fluid supplied to the brake cylinder, as will be evident. The brakes may be wholly or partially released by relieving the pressure of the foot on the button 6. The pressure of spring 19 is thus reduced and the diaphragm 17 is then deflected upwardly, so as to permit movement of the bar 33, such that the release valve 37 is permitted to unseat. Fluid is vented from chamber 38 and the brake cylinder until the pressure on the diaphragm 17 has been reduced to a degree slightly less than that of the spring 19, when the spring operates to deflect the diaphragm 17 downwardly, sufficiently to cause the release valve 37 to seat.

If the operator should become incapacitated or should he for other reasons remove his heel from the plunger 28, the pressure of spring 30 being greater than that of spring 19, the yoke lever 26 is actuated by the spring 30 to depress the stem 21 and thus cause the spring 19 to be compressed, so that the brake valve device is actuated to cause fluid under pressure to be supplied to the brake cylinder, to effect an application of the brakes, the same as when the lever 23 is actuated to depress the stem 21, as hereinbefore described.

In making a stop on an ascending grade, it may be necessary to release the button 6, in order to obtain power for propelling the car and this movement would also release the brake. Under such circumstances, the brake may be held applied by relieving the pressure of the heel on the plunger 28 to a sufficient extent so as to cause the operation of the brake valve device to effect an application of the brakes with the desired power, or if the fluid pressure brakes have been applied by operation of the button 6, the brakes may be maintained applied when the button 6 is released, by relieving the pressure on the plunger 28, so that the yoke lever 26 operates to hold the spring 19 compressed to the desired amount.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle braking apparatus, the combination with a device for controlling the operation of a fluid pressure brake, of a manually operable member movable to mechanically set up circuits for producing a dynamic braking action and adapted upon a further movement to mechanically operate said device to cause a fluid pressure brake application.

2. In a vehicle braking apparatus, the combination with a device for controlling the operation of a fluid pressure brake, of a manually operable member, means mechanically operated by said member for setting up circuits for producing a dynamic braking action upon a predetermined movement of said member, said device being mechanically operated by said member to effect a fluid pressure application of the brakes upon a further movement of said member.

3. In a vehicle braking apparatus, the combination with a device for controlling the operation of a fluid pressure brake, of a manually operable member, means mechanically controlled by said member for setting up circuits for producing a dynamic braking action upon a predetermined movement of said member, said device being mechanically operated by said member to effect a fluid pressure application of the brakes and to cut the dynamic brake out of action, upon a further movement of said member.

4. In a vehicle braking apparatus, the combination with a device for controlling the operation of a fluid pressure brake and a dynamic brake controlling means, of a foot operable member movable to a position in which said dynamic brake controlling means is mechanically operated to produce a dynamic braking action and to another position in which said device is mechanically operated by said member to effect a fluid pressure application of the brakes.

5. In a vehicle braking apparatus, the combination with a valve device operable by mechanically applied pressure to effect a fluid pressure application of the brakes, of means operated when depressed by the operator for mechanically applying pressure to said valve device to effect an application of the brakes and means operated when released by the operator to mechanically apply pressure to said valve device to effect an application of the brakes.

6. In a vehicle braking apparatus, the combination with a valve device operable by mechanically applied pressure to effect a fluid pressure application of the brakes, of a member operated upon depression by the foot of the operator to apply pressure mechanically to said valve device and means normally held depressed by the foot of the operator and operable to apply pressure mechanically to said valve device upon release by the operator.

7. In a vehicle braking apparatus, the combination with a valve device operable by mechanically applied pressure to effect a fluid pressure application of the brakes, of means controlled by the heel and toe of the operator for mechanically applying pressure to said device, said means being operated to cause said device to apply the brakes either by pressure applied by the toe or by relieving said means of pressure applied by the heel.

8. In a vehicle braking apparatus, the combination with a manually depressible member, of means mechanically operated upon depression of said member for setting up circuits to produce a dynamic braking action, a valve device mechanically operated upon a further depression of said member for effecting a fluid pressure application of the brakes, and means operated when released by the operator for operating said valve device to effect an application of the brakes.

9. In a vehicle braking apparatus, the combination with a manually depressible member, of means mechanically operated upon depression of said member for setting up circuits to produce a dynamic braking action, a valve mechanically operated upon a further depression of said member for effecting a fluid pressure application of the brakes, a spring operatively connected to said valve device and tending to operate same to effect an application of the brakes, and a manually operated member for depressing said spring to normally prevent operation of said valve device by said spring.

10. In a vehicle braking apparatus, the combination with a member adapted to be depressed by the foot of the operator, of means mechanically operated upon depression of said member to set up circuits for causing a dynamic brake to act, a valve device mechanically operated upon a further depression of said member to effect a fluid pressure application of the brakes, a spring operatively connected to said valve device and adapted upon release to operate said valve device to effect an application of the brakes, and a member adapted to be operated by the foot of the operator to prevent said spring from actuating said valve device.

In testimony whereof I have hereunto set my hand, this 2nd day of August, 1929.

CLYDE C. FARMER.